United States Patent [19]

Takeda et al.

[11] Patent Number: 5,840,364
[45] Date of Patent: Nov. 24, 1998

[54] COATING SOLUTION FOR A HEAT-RAY SHIELDING FILM AND A PROCESS FOR FORMING A HEAT-RAY SHIELDING FILM BY EMPLOYING THE SAME

[75] Inventors: Hiromitsu Takeda; Yoshihiro Ohtsuka, both of Ichikawa; Kenji Adachi, Inzai; Hiroko Kuno, Matsudo, all of Japan

[73] Assignee: Sumitomo Metal MIning Company, Limited

[21] Appl. No.: 764,006

[22] Filed: Dec. 12, 1996

[30] Foreign Application Priority Data

Dec. 12, 1995 [JP] Japan ................................. 7-322622
Apr. 22, 1996 [JP] Japan ................................. 8-100075
May 14, 1996 [JP] Japan ................................. 8-119280

[51] Int. Cl.$^6$ ........................................................ B05B 5/00
[52] U.S. Cl. .......................... 427/160; 427/402; 524/403
[58] Field of Search ............................ 524/403; 427/160, 427/402

[56] References Cited

U.S. PATENT DOCUMENTS

| | | | |
|---|---|---|---|
| 4,024,318 | 5/1977 | Forster | 524/403 |
| 4,315,845 | 2/1982 | Takahashi | 524/403 |
| 4,377,652 | 3/1983 | Ohmura | 524/403 |
| 4,402,996 | 9/1983 | Gauger | 524/403 |
| 4,421,660 | 12/1983 | Hajna | 524/403 |
| 4,521,549 | 6/1985 | Penneck | 524/403 |
| 4,548,979 | 10/1985 | Weise | 524/403 |
| 4,701,218 | 10/1987 | Barker | 524/403 |
| 4,830,894 | 5/1989 | Roche | 428/34.5 |
| 5,340,387 | 8/1994 | Smith | 524/403 |

*Primary Examiner*—Paul R. Michl
*Attorney, Agent, or Firm*—Watson Cole Grindle Watson, P.L.L.C.

[57] ABSTRACT

A coating solution which forms a heat-ray shielding film on a transparent base of glass or plastic includes a dispersion obtained by dispersing in a dispersion medium as its main component fine particles of one or more oxides selected from the group consisting of ruthenium-, iridium- and rhodium-containing oxides, the particles having an average particle diameter of 100 nm or less.

4 Claims, No Drawings

COATING SOLUTION FOR A HEAT-RAY SHIELDING FILM AND A PROCESS FOR FORMING A HEAT-RAY SHIELDING FILM BY EMPLOYING THE SAME

FIELD OF THE INVENTION

This invention relates to a heat-ray shielding film for imparting a heat-ray shielding function to a transparent base, as of glass or plastics, and more particularly, to a coating solution for a heat-ray shielding film containing one or more of ruthenium-, iridium- and rhodium-containing oxides as its principal component.

BACKGROUND OF THE INVENTION

The rays of the sun are roughly classified into three types of radiation, i.e., near-infrared radiation (or heat rays), visible light and ultraviolet radiation. Heat rays are rays having a range of wavelengths which are perceived as heat energy by the human body, and ultraviolet radiation is radiation having a range of wavelengths which have an adverse effect on the human body, such as the development of a skin cancer. Accordingly, if a transparent base, as of glass or plastics, which is used as, for example, a building material for a window in a house, can transmit only visible light and cut off heat rays and ultraviolet radiation, it is not only possible to prevent a temperature rise in a room in summer, but it is also desirable for health care.

It has been usual to employ as this kind of heat-ray shielding film a material having a large amount of conduction electrons, such as gold, silver, copper, aluminum or titanium nitride. A shielding film containing these materials, however, has the drawback of lowering the transmittance of visible light, since it not only exhibits a heat-ray shielding effect, but also has the property of reflecting or absorbing visible light.

If a heat-ray shielding film utilizing these materials is used for a transparent base, such as a building material, therefore, it is necessary to make the thickness of the shielding film very small to raise the transmittance of visible light, but it has been undesirable because of not only its lower heat-ray shielding effect and failure to produce satisfactory results, but also its lower strength. Moreover, if a purely metallic material is used as a material for a heat-ray shielding film, there is the problem, that it is likely to undergo mutual diffusion with a transparent base, resulting in a film which is unsatisfactory in stability.

Indium tin oxide (ITO), aluminum-containing zinc oxide (AZO), etc., are known as materials having the property of transmitting visible light and a heat-ray shielding effect, but it has been difficult to obtain a satisfactory heat-ray shielding effect from any heat-ray shielding film formed by employing those materials, since they have only a low power of plasmon reflection.

Moreover, dry coating methods, such as sputtering and vacuum evaporation, are used for making a heat-ray shielding film by employing gold, silver, copper, aluminum, titanium nitride, ITO or AZO as mentioned above, or like materials, but these film-forming methods have presented problems, as they require a large vacuum apparatus, are low in productivity, have difficulty in forming a film over a large area and involve a high cost of production.

SUMMARY OF THE INVENTION

It is an object of this invention to overcome the problems as pointed out above in respect of the conventional heat-ray shielding films and provide a coating solution for a heat-ray shielding film which makes it possible to produce without the aid of any physical film-forming method having a high cost of production, but by employing a wet coating method which is easy to carry out, a heat-ray shielding film which has a satisfactory heat-ray shielding effect, which can be controlled in transmittance of visible light 1, and which has a high level of strength can be provided. It is another object of this invention to provide a process for forming a heat-ray shielding film employing the above coating solution.

For attaining the above objects, this invention involves a coating solution for a heat-ray shielding film which comprises as its main component a dispersion obtained by dispersing in a dispersing solvent fine particles of one or more oxides selected from the group consisting of ruthenium-, iridium- and rhodium-containing oxides, those particles having a particle diameter not exceeding 100 nm.

Ruthenium dioxide ($RuO_2$), bismuth ruthenate ($Bi_2Ru_2O_7$), lead ruthenate ($Pb_2Ru_2O_{6.5}$), etc., can be mentioned as the preferred ruthenium-containing oxides which are used for the purpose of this invention. Iridium dioxide ($IrO_2$), bismuth iridate ($Bi_2Ir_2O_7$), lead iridate ($Pb_2Ir_2O_{6.5}$), etc. can be mentioned as the preferred iridium-containing oxides. Rhodium dioxide ($RhO_2$) can be mentioned as the preferred rhodium-containing oxide. It is possible to use either one of these oxides, or a mixture of two or more.

The coating solution according to this invention may further contain a resin binder and/or one or more selected from the group consisting of alkoxides of metals, such as silicon, zirconium, titanium and aluminum, and partially hydrolyzed polymers of those metal alkoxides to enable a still higher heat-shielding effect.

The heat-ray shielding film of this invention can be obtained if the coating solution as described above is applied onto a given base, particularly a transparent base, such as glass or plastics, and heated. According to another mode of carrying out this invention, the heat-ray shielding film can be obtained as a multilayer film if a coating solution containing fine particles of ruthenium-, iridium- or rhodium-containing oxide as stated above, or a mixture thereof is applied onto a base, and heated to form a first film-forming layer, and if a solution containing a resin binder and/or a metal alkoxide, or a partially hydrolyzed polymer thereof as stated above, etc., is applied onto the first film-forming layer, and heated to form a second film-forming layer.

According to still another mode of carrying out this invention, the heat-ray shielding film can be obtained as a multilayer film if a coating solution containing fine particles of ruthenium-, iridium- or rhodium-containing oxide as stated above, or a mixture thereof, is applied onto a base to form a first coating layer, and if a solution containing a resin binder and/or a metal alkoxide, or a partially hydrolyzed polymer thereof as stated above, etc., is applied onto the first coating layer to form a second coating layer, and if they are heated.

DETAILED DESCRIPTION OF THE INVENTION

This invention is a coating solution for a heat-ray shielding film which contains as its main component fine particles of one or more oxides selected from the group consisting of ruthenium-, iridium- and rhodium-containing oxides, and having a particle diameter not exceeding 100 nm, and a process for forming a heat-ray shielding film employing the coating solution, as stated above.

When the above oxides used for the purpose of this invention are dispersed in a coating film as fine particles having a particle diameter not exceeding 100 nm, they enable an outstanding heat-ray shielding effect to be exhibited without affecting substantially the transmittance of visible light, and the film also has a considerable level of ultraviolet absorptivity. If the oxide particles have a particle diameter exceeding 100 nm, their aggromeration in the coating solution is more likely to occur and result in their settling in the solution without being dispersed. Particles having a particle diameter exceeding 100 nm, or coarse particles formed by the cohesion of those particles also cause the scattering of radiation and thereby lower the transmittance of visible light, and are, in either event, undesirable.

A process for manufacturing the coating solution of this invention comprises the step of dispersion treatment by which fine particles of ruthenium-, iridium- or rhodium-containing oxide, or a mixture thereof having an average particle diameter not exceeding 100 nm are dispersed at a high concentration in a polar solvent used as a dispersion medium, and the step of mixing a polar solvent for dilution therein. It is adequate that the amount of the oxide particles in the coating solution should not exceed 30% by weight, and preferably, should not exceed 10% by weight.

As the polar solvent for dispersion, it is possible to use any one without any particular limitation if it has an appropriate boiling point not exceeding the temperature employed for heating after application, and can efficiently disperse the fine oxide particles, and it is possible to mention, for example, water, N-methyl-2-pyrrolidone (NMP), ethanol, 4-hydroxy 4-methyl-2-pentanone (diacetone alcohol), isopropyl alcohol, N, N-dimethylformamide (DMF), dimethylacetamide, methyl cellosolve, acetone and tetrahydroxyfuran.

In order to raise the dispersion stability of the fine oxide particles, it is possible to add as an auxiliary dispersant a small amount of a silane, zirconate, aluminate, or other coupling agent, a polycarboxylic acid, phosphoric ester, silicone, or other surface active agent, etc. The adequate amount thereof is not more than 30%, or preferably, not more than 5%, by weight of the total amount of oxide.

As the polar solvent for dilution, it is possible to use any one without any particular limitation if it is compatible with the polar solvent for dispersion and the dispersion stabilizer, has a boiling point not exceeding the temperature employed for heating the coating solution after application, and can improve the applicability of the coating solution so that it may form a uniform and smooth coating film when it is applied, or when a film is formed, and it will be possible for anybody of ordinary skill in the art to choose an appropriate solvent.

Although the coating solution for a heat-ray shielding film according to this invention comprises a dispersion obtained by dispersing fine particles of ruthenium-, iridium- or rhodium-containing oxide, or a mixture of those oxides, as stated above, it is optionally possible to mix a resin binder therein to achieve still more favorable results. This is due to the fact that even when a dispersion obtained by dispersing only the fine oxide particles as stated above is used as a coating solution, and applied onto a transparent base, its heating after application enables a film to be formed by a deposit of the fine oxide particles on the base and perform a satisfactory heat-ray shielding function, but that the use of a coating solution obtained by mixing a resin binder in such a dispersion enables its resin component to fill the interstices of the fine oxide particles deposited on the base and improve the strength of the film by virtue of its binder effect, while the resin component filling the interstices produces the effects of reducing the haze of the film and improving the transmittance of visible light. As the resin binder which is used, it is possible to mention a thermoplastic resin such as an acrylic resin, a thermosetting resin such as an epoxy resin, an ultraviolet-curing resin, an electron beam-curing resin, etc.

If an alkoxide of a metal such as silicon, zirconium, titanium or aluminum, or a partially hydrolyzed polymer of any such alkoxide, or a mixture of both is optionally added into the above dispersion of fine oxide particles, and if the dispersion is used as a coating solution for a heat-ray shielding film according to this invention, favorable results can be obtained, since those metal compounds polymerize and solidify as the oxides of those metals when a coating film is heated, and they are dispersed in the interstices of a deposit of fine particles of ruthenium-containing oxide, etc., in the film formed on the base and serve to improve the strength of the film and its bonding to the base. In this connection, it is adequate that the total amount of the alkoxide of a metal such as silicon, zirconium, titanium or aluminum, or the partially hydrolyzed polymer of the metal alkoxide which the coating solution can contain should not exceed 30% by weight of the amount of fine particles of ruthenium-containing oxide, etc., when considered in terms of the oxide of any such metal which is formed by heating after application.

The coating solution for a heat-ray shielding film according to this invention can be used to form a heat-ray shielding film on a transparent base, such as glass, if the coating solution is applied onto the base, and if the base is heated at an appropriate temperature. Any method can be employed without any particular limitation for applying the coating solution if it can apply the coating solution in a smooth, thin and uniform layer on the base, and it is possible to employ a common method of application, for example, spin, spray or dip coating, or screen printing.

The temperature at which the base is heated after the application of the coating solution is preferably not lower than 100° C., since if any water, or organic solvent in the coating solution still remains in a coating film after heating, it is likely to lower the visible light transmittance of the film and also its strength and weatherability, and if any organic solvent is used in the coating solution, it is preferable to employ a temperature which is not lower than the boiling point of the organic solvent. If the coating solution contains the alkoxide of any metal such as silicon, zirconium, titanium or aluminum, or the partially hydrolyzed polymer of the alkoxide, it is preferable to employ a heating temperature which is not lower than 200° C., or more preferably, not lower than 250° C., since the polymerization reaction of the alkoxide, or partially hydrolyzed polymer in the coating film is very likely to remain incomplete at a temperature which is lower than 250° C. Moreover, if the coating solution contains a resin binder, it is necessary to determine the heating temperature for the coating solution experimentally beforehand, since the temperature at which its resin component exhibits a satisfactory binder effect differs with the kind of the resin binder employed.

The heat-ray shielding film according to the second mode of carrying out this invention can be obtained as a multilayer film if a dispersion prepared by dispersing fine particles of ruthenium-, iridium- or rhodium-containing oxide, or a mixture of those oxides is applied onto a base, and heated to form a first film-forming layer, and if a solution containing a resin binder and/or a metal alkoxide as mentioned above, or a partially hydrolyzed polymer of the alkoxide, etc., is applied onto the first film-forming layer, and heated to form a second film-forming layer, and the heating temperature employed in this case may be an appropriate temperature which is not lower than 100° C. for the first film-forming layer, and not lower than 200° C. for the second film-forming layer, and depends on the film-forming materials employed.

The multilayer heat-ray shielding film according to the third mode of carrying out this invention can be obtained if a dispersion prepared by dispersing fine particles of ruthenium-, iridium- or rhodium-containing oxide, or a mixture of those oxides is applied onto a base to form a first coating layer, if a solution containing a resin binder and/or a metal alkoxide as mentioned above, or a partially hydrolyzed polymer of the alkoxide, etc., is applied onto the first coating layer to form a second coating layer, and if the base is heated to a temperature not lower than 200° C. to form the coating layers into a film. It is alternatively possible to form a third coating layer from a resin binder after forming a second coating layer from a metal alkoxide on a first coating layer formed from fine particles of ruthenium-containing oxide, etc., and to form a film by heating.

The thickness of a heat-ray shielding film formed in accordance with this invention depends on the heat-ray shielding effect and transparency as required of the base, but is usually preferably from, say, 0.05 to 5 microns. If the film thickness is less than 0.05 micron, no satisfactory heat-ray shielding effect can be obtained, and it is likely that the distribution of fine oxide particles in the film may lack uniformity. No film thickness exceeding 5 microns is desirable, since it is difficult to maintain the satisfactory transparency of the base.

As the ruthenium-, iridium- or rhodium-containing oxide which the heat-ray shielding film of this invention contains as its main component has a high electrical conductivity, the heat-ray shielding film formed by employing it alone is a film of high electrical conductivity, but if a heat-ray shielding film is formed from a coating solution containing a resin binder and/or an alkoxide of a metal such as silicon, zirconium, titanium or aluminum, or a partially hydrolyzed polymer of the alkoxide, etc., or if a multilayer film is formed therefrom, the heat-ray shielding film can be so formed that a resin component, or metal oxide having a high electrical insulating property may fill the interstices in a deposit of fine particles of ruthenium-, iridium- or rhodium-containing oxide, etc., and isolate the fine particles electrically from each other, thereby making it possible to obtain a transparent base covered with a heat-ray shielding film having a high surface resistivity not lower than 1 MΩ/□, which is useful for a wide range of purposes, as when used as a building material, it enables the indoor use of radio communications apparatus such as portable telephones, or radio communications apparatus such as radios, televisions and pocket bells.

The color of a transparent heat-ray shielding film according to this invention depends on the fine oxide particles employed and the state of their distribution. For example, the ruthenium-containing oxide presents a bronze to dark green color, and can not only cut off heat rays and ultraviolet radiation, but also give a beautiful color to the base on which the film is formed. If a film is formed on a transparent base such as glass, it can be used as a privacy protecting film, too, if its thickness is large.

If the coating dispersion of this invention further contains a titanium oxide, zinc oxide, or cerium oxide solution as an inorganic ultraviolet shielding material, or one or more selected from the group consisting of benzophenone, benzotriazole, etc., as an organic ultraviolet shielding material, it is possible to obtain a heat-ray shielding coating film having a still improved ultraviolet shielding function.

If the heat-ray shielding film of this invention is formed on a transparent base, such as glass, it can be used as a filter for the rays of the sun, and if the solvent, etc., are appropriately selected, it is possible to form a film giving the function of a filter for the rays of the sun to the transparent base immediately after its application, and solidification at normal temperature, while the heat-ray shielding film of this invention can also be formed on a thin transparent film, as of plastics, so that the latter film may be bonded to a given transparent base directly with an adhesive, etc., for sale as a filter for the rays of the sun or a privacy protecting film, and thus, it is useful for a wide range of purposes.

EXAMPLES

The following is a description of examples in which this invention is embodied. These examples are, however, not intended for limiting this invention.

Example 1

Preparation of a solution A (dispersion of fine particles of $RuO_2$:

A dispersion of $RuO_2$ in the amount of 100 g was prepared by mixing 22 g of fine particles of $RuO_2$ (having an average particle diameter of 30 nm), 20 g of N-methyl-2-pyrrolidone (NMP), 10 g of diacetone alcohol (DAA), 47.5 g of water and 0.5 g of a titanate coupling agent (product of Ajinomoto Corp. having the tradename "PRENACT KR-44") for 100 hours in a ball mill employing zirconia balls having a diameter of 4 mm.

Preparation of a solution B (alkoxide solution):

A mixed ethyl silicate solution in the amount of 1150 g was prepared by mixing under stirring 50 g of an ethyl silicate solution consisting of 6 g of Ethyl Silicate 40 having an average polymerization degree of 4 to 5 (product of Tama Chemical Industrial Co., Ltd.), 31 g of ethanol, 8 g of a 5% aqueous solution of hydrochloric acid and 5 g of water, 800 g of water, and ethanol.

Preparation of a solution C (mixed $RuO_2$-alkoxide dispersion):

The above solutions A and B were thoroughly mixed under stirring to prepare a mixed dispersion of fine $RuO_2$ particles and ethyl silicate.

Formation of a heat-ray shielding film:

The solution C in the amount of 15 g taken in a beaker was dropped onto a soda-lime sheet-glass base measuring 200 by 200 by 3 mm and rotating at a rotating speed of 150 rpm, and its rotation was further continued for five minutes to coat the sheet-glass base uniformly with the solution C, whereafter the sheet glass was heated for 30 minutes in an electric oven at 200° C., whereby an intended heat-ray shielding film was formed on the sheet-glass base.

Performance tests for the heat-ray shielding film:

The sheet-glass base on which the heat-ray shielding film had been formed as described above was tested for transmitting the rays of the sun, whereby its transmittance of visible light and heat rays, and its surface resistivity were determined.

The transmittance of either type of rays of the sun was measured at 340 to 1800 nm by employing a spectrophotometer made by Hitachi Limited, and the transmittance (%) of visible light and the transmittance (%) of heat rays solar transmittance were calculated in accordance with JIS R 3106, while the surface resistivity (MΩ/□) was measured by employing a surface resistivity meter made by Mitsubishi Petrochemical Co., Ltd. The results are shown in Table 1. Table 1 also shows the $RuO_2$ concentration (%) and ethyl silicate concentration (%) in the solution C and the presence or absence of a second layer.

Example 2

A heat-ray shielding film was formed on a glass base by employing 20 g of fine $RuO_2$ particles and 49.5 g of water for the solution A and 9 g of Ethyl Silicate 40 and 28 g of ethanol for the solution B and otherwise repeating Example 1, and tests were conducted for the evaluation of the shielding film by repeating Example 1. The results are shown in Table 1.

Example 3

Preparation of a solution A ($RuO_2$ dispersion):

A dispersion of $RuO_2$ (solution A) was prepared by employing 8.8 g of fine $RuO_2$ particles and 60.7 g of water for the solution A and otherwise repeating Example 1.

Preparation of a solution B (ethanol solution):

An ethanol solution (solution B) was prepared by employing only 45 g of ethanol without employing any Ethyl Silicate 40, or aqueous solution of hydrochloric acid, and otherwise repeating Example 1.

Preparation of a solution C ($RuO_2$ dispersion):

The above solutions A and B were thoroughly mixed under stirring to prepare a dispersion of fine $RuO_2$ particles.

Preparation of a solution D (alkoxide coating solution):

An ethyl silicate coating solution in the amount of 100 g was separately prepared by mixing under stirring 1.5 g of Ethyl Silicate 40 having an average polymerization degree of 4 to 5 (product of Tama Chemical Industrial Co., Ltd.), 80 g of ethanol, 6 g of a 5% aqueous solution of hydrochloric acid and 12.5 g of water.

Formation of a heat-ray shielding film:

The solution C in the amount of 15 g taken in a beaker was dropped onto a soda-lime sheet-glass base measuring 200 by 200 by 3 m and rotating at a rotating speed of 150 rpm, and its rotation was further continued for five minutes to coat the sheet-glass base uniformly with the solution C, whereafter the solution D in the amount of 15 g taken in a beaker was likewise dropped with the sheet glass kept in rotation and its rotation was further continued for five minutes to coat the solution C uniformly with the solution D. Then, the sheet glass was heated for 30 minutes in an electric oven at 200° C., whereby a multilayer heat-ray shielding film having a film of $RuO_2$ as a first layer and silicon oxide as a second layer was formed on the sheet-glass base.

Performance tests for the heat-ray shielding film:

The sheet-glass base on which the multilayer heat-ray shielding film had been formed as described above was examined for its transmittance of visible light, its transmittance of heat rays and its surface resistivity in the same way as in Example 1. The results are shown in Table 1.

Example 4

A multilayer heat-ray shielding film was formed on a glass base by employing 15 g of fine $RuO_2$ particles and 54.5 g of water for the solution A and otherwise repeating Example 3, and was tested in the same way as in Example 1. The results are shown in Table 1.

Example 5

A multilayer heat-ray shielding film was formed on a glass base by employing 21.25 g of fine $RuO_2$ particles and 48.25 g of water for the solution A and otherwise repeating Example 3, and was tested in the same way as in Example 1. The results are shown in Table 1.

Example 6

A multilayer heat-ray shielding film was formed on a glass base by employing 27.5 g of fine $RuO_2$ particles and 42 g of water for the solution A and otherwise repeating Example 3, and was tested in the same way as in Example 1. The results are shown in Table 1.

TABLE 1

| Example No. | Concentration of solid in solution C (wt %) | Ratio of concentration of solid in solution C (wt %) | Presence of second layer | Visible light transmittance (%) | Solar transmittance (%) | Surface resistivity ($\Omega/\square$) |
| --- | --- | --- | --- | --- | --- | --- |
| Ex. 1 | 1.76 | 0.48 | No | 59.33 | 48.82 | $2 \times 10^6$ |
| Ex. 2 | 1.6 | 0.72 | No | 62.78 | 51.20 | $5 \times 10^7$ |
| Ex. 3 | 0.70 | 0 | Yes | 75.25 | 63.40 | — |
| Ex. 4 | 1.2 | 0 | Yes | 64.75 | 53.00 | — |
| Ex. 5 | 1.7 | 0 | Yes | 53.81 | 42.12 | $2 \times 10^4$ |
| Ex. 6 | 2.2 | 0 | Yes | 50.10 | | — |

Example 7

Preparation of a solution A (dispersion of fine particles of $RuO_2$):

A dispersion of $RuO_2$ in the amount of 100 g was prepared by mixing 15 g of fine particles of $RuO_2$ (having an average particle diameter of 30 nm), 23 g of N-methyl-2-pyrrolidone (NMP), 14 g of diacetone alcohol (DAA), 47.5 g of water and 0.5 g of a titanate coupling agent (product of Ajinomoto Corp. having the tradename "PRENACT KR-44") for 100 hours in a ball mill employing zirconia balls having a diameter of 4 mm.

Preparation of a solution B (alkoxide solution):

An ethyl silicate solution in the amount of 50 g was prepared by mixing under stirring 18.75 g of Ethyl Silicate 40 having an average polymerization degree of 4 to 5 (product of Tama Chemical Industrial Co., Ltd.), 18.25 g of ethanol, 8 g of a 5% aqueous solution of hydrochloric acid and 5 g of water.

Preparation of a solution C (a mixed $RuO_2$-alkoxide dispersion):

Equal amounts of the above solutions A and B were mixed under stirring, and their mixture was diluted with ethanol to prepare a mixed dispersion having a solid content of 4% by weight consisting of fine $RuO_2$ particles and ethyl silicate.

Formation of a heat-ray shielding film:

The solution C in the amount of 20 g taken in a beaker was dropped onto a soda-lime sheet-glass base measuring 200 by 200 by 3 mm and rotating at a rotating speed of 150 rpm, and its rotation was further continued for five minutes to coat the sheet-glass base uniformly with the solution C, whereafter the sheet glass was heated for an hour in an electric oven at 250° C., whereby an intended heat-ray shielding film was formed on the sheet-glass base.

Performance tests for the heat-ray shielding film:

The sheet-glass base on which the heat-ray shielding film had been formed as described above was examined for its transmittance of visible light and heat rays in the same way as in Example 1, and for its transmittance of ultraviolet radiation in accordance with ISO 9050. The haze value of the base was measured by using a haze meter. The abrasion strength of the base was determined by conducting an abrasion test by a Taber abrasion tester (employing a CF-S truck wheel and a load of 500 g, and rotating it 1000 times), measuring a difference of haze between before and after its abrasion and obtaining its absolute value as a measure of its abrasion strength. The results are shown in Table 2. Table 2 also shows the concentration (% by weight) of the solids in the solution C and the ratio of the concentrations of the solids therein ($SiO_2$/ruthenium oxide in terms of $RuO_2$).

Example 8

A heat-ray shielding film was formed on a glass base by employing a firing temperature of 350° C. and otherwise repeating Example 7, and was tested in the same way as in Example 7. The results are shown in Table 2.

Example 9

A heat-ray shielding film was formed on a glass base by employing a firing temperature of 400° C. and otherwise repeating Example 7, and was tested in the same way as in Example 7. The results are shown in Table 2.

Example 10

A heat-ray shielding film was formed on a glass base by employing a firing temperature of 600° C. and otherwise repeating Example 7, and was tested in the same way as in Example 7. The results are shown in Table 2.

Example 11

A heat-ray shielding film was formed on a glass base by employing a solid concentration of 1% by weight in the solution C and otherwise repeating Example 9, and was tested in the same way as in Example 7. The results are shown in Table 2.

Example 12

A heat-ray shielding film was formed on a glass base by employing a solid concentration of 3.5% by weight in the solution C and otherwise repeating Example 9, and was tested in the same way as in Example 7. The results are shown in Table 2.

Example 13

A heat-ray shielding film was formed on a glass base by employing a solid concentration of 5% by weight in the solution C, a solid concentration ratio of 1.5 ($SiO_2$/ruthenium oxide in terms of $RuO_2$) and a heating temperature of 500° C. and otherwise repeating Example 7, and was tested in the same way as in Example 7. The results are shown in Table 2.

Example 14

A heat-ray shielding film was formed on a glass base by employing a solid concentration of 3% by weight in the solution C and a solid concentration ratio of 0.30 ($SiO_2$/ruthenium oxide in terms of $RuO_2$) and otherwise repeating Example 7, and was tested in the same way as in Example 7. The results are shown in Table 2.

Example 15 (Comparative Example)

A heat-ray shielding film was formed on a glass base by employing a firing temperature of 180° C. and otherwise repeating Example 7, and was tested in the same way as in Example 7. The results are shown in Table 2.

Example 16 (Comparative Example)

A heat-ray shielding film was formed on a glass base by employing a solid concentration of 5% by weight in the solution C, a solid concentration ratio of 0.20 ($SiO_2$/ruthenium oxide in terms of $RuO_2$) and a heating temperature of 500° C. and otherwise repeating Example 7, and was tested in the same way as in Example 7. The results are shown in Table 2.

TABLE 2

| Example No. | Solid concentration in solution C (wt %) | Ratio of solid concentrations in solution C (wt %) | Heating temperature (°C.) | Haze (%) | Transmittance of visible light (%) | Solar Transmittance (%) | Transmittance of ultraviolet radiation (%) | Surface resistivity (Ω/□) | Abrasion strength |
|---|---|---|---|---|---|---|---|---|---|
| Ex. 7 | 4 | 100 | 250 | 0.5 | 36.5 | 26.3 | 7.1 | >$10^{12}$ | 5.3 |
| Ex. 8 | 4 | 100 | 350 | 0.2 | 36.1 | 26.0 | 8.3 | >$10^{12}$ | 2.5 |
| Ex. 9 | 4 | 100 | 400 | 0.2 | 36.1 | 26.2 | 8.0 | >$10^{12}$ | 1.8 |
| Ex. 10 | 4 | 100 | 600 | 0.2 | 34.9 | 24.9 | 7.1 | >$10^{12}$ | 0.6 |
| Ex. 11 | 1 | 100 | 400 | 0.3 | 74.81 | 62.6 | 37.0 | >$10^{12}$ | 1.2 |
| Ex. 12 | 3.5 | 100 | 400 | 0.4 | 47.8 | 36.7 | 14.7 | >$10^{12}$ | 1.9 |
| Ex. 13 | 5 | 150 | 500 | 0.5 | 36.5 | 28.1 | 9.5 | >$10^{12}$ | 2.2 |
| Ex. 14 | 3 | 30 | 600 | 0.1 | 32.8 | 22.9 | 7.7 | >$10^{12}$ | 3.7 |
| Ex. 15 | 5 | 150 | 180 | 0.5 | 36.1 | 27.7 | 9.4 | >$10^9$ | Peel |
| Ex. 16 | 3 | 20 | 500 | 0.4 | 31.2 | 22.0 | 7.0 | >$10^9$ | Peel |

Example 17

Preparation of a solution A (dispersion of fine particles of $RuO_2$)

A dispersion of $RuO_2$ in the amount of 100 g was prepared by mixing 15 g of fine particles of $RuO_2$ (having an average particle diameter of 30 nm), 23 g of N-methyl-2-pyrrolidone (NMP), 14 g of diacetone alcohol (DAA), 47.5 g of water and 0.5 g of a titanate coupling agent (product of Ajinomoto Corp. having the tradename "PRENACT KR-44") for 100 hours in a ball mill employing zirconia balls having a diameter of 4 mm.

Preparation of a solution B (resin binder solution):

Prepared was a methyl-ethyl-ketone solution containing 50% by weight of an epoxy resin.

Preparation of a solution C (mixed $RuO_2$-resin binder dispersion):

The above solutions A and B were mixed and their mixture was diluted with ethanol to prepare a mixed dispersion containing the solid ruthenium oxide and epoxy resin in the amount of 4% by weight and having a ruthenium oxide and epoxy resin ratio by weight of 75:25.

Formation of a heat-ray shielding film:

The above solution C was uniformly applied onto a soda-lime sheet-glass base measuring 200 by 200 by 3 mm by using a bar coater and the sheet glass was heated for an hour in an electric oven at 150° C. to cure the resin component, whereby an intended heat-ray shielding film was formed on the sheet-glass base.

Performance tests for the heat-ray shielding film:

The sheet-glass base on which the heat-ray shielding film had been formed as described above was examined for its transmittance of visible light and heat rays in the same way as in Example 1, and for its transmittance of ultraviolet radiation in accordance with ISO 9050. The haze value of the base was measured by using a haze meter. The results are shown in Table 3. Table 3 also shows the concentration (% by weight) of the solids in the solution C and the ratio of the solid concentrations ($RuO_2$:resin).

Example 18

A heat-ray shielding film was formed on a glass base by employing a solid concentration of 1.2% by weight in the solution C and a ruthenium oxide and epoxy resin ratio by weight ($RuO_2$:resin) of 80:20 and otherwise repeating Example 17, and was tested in the same way as in Example 17. The results are shown in Table 3.

Example 19

A heat-ray shielding film was formed on a glass base by employing a solid concentration of 1.4% by weight in the solution C and a ruthenium oxide and epoxy resin ratio by weight ($RuO_2$:resin) of 70:30 and otherwise repeating Example 17, and was tested in the same way as in Example 17. The results are shown in Table 3.

Example 20

A two-layer heat ray shielding film was formed on a glass base by employing only the solution A in Example 17 to prepare a solution C having a solid concentration of 0.8% by weight and heating the glass base coated with the solution C after drying it for 30 minutes in an electric over at 80° C., and otherwise repeating Example 17, and was tested in the same way as in Example 17. The results are shown in Table 3.

Example 21

A heat-ray shielding film was formed on a glass base by replacing the epoxy resin in the solution B with an acrylic resin and employing a solid concentration of 1.3% by weight in the solution C and a ruthenium oxide and epoxy resin ratio by weight ($RuO_2$:resin) of 85:15 and otherwise repeating Example 17, and was tested in the same way as in Example 17. The results are shown in Table 3.

Example 22

A heat-ray shielding film was formed on a glass base by employing a solid concentration of 4% by weight in the solution C and otherwise repeating Example 17, and was tested in the same way as in Example 17. The results are shown in Table 3.

Example 23

A solution A was prepared by employing 15 g of fine particles of iridium oxide ($IrO_2$) having a particle diameter of 35 nm instead of fine particles of ruthenium oxide ($RuO_2$) and 0.6 g of a silane coupling agent instead of the titanate coupling agent and otherwise repeating Example 17, and a shielding film was formed on a glass base by employing a solid concentration of 1.3% by weight in the solution C and otherwise repeating Example 17, and was tested in the same way as in Example 17. The results are shown in Table 3.

Example 24

A shielding film was formed on a glass base by employing 15 g of fine particles of lead ruthenate ($Pb_2Ru_2O_{6.5}$) having a particle diameter of 35 nm instead of fine particles of ruthenium oxide ($RuO_2$), and employing a solid concentration ratio (ratio by weight of lead ruthenate:resin) of 80:20 in the solution C and otherwise repeating Example 21, and was tested in the same way as in Example 17. The results are shown in Table 3.

Example 25

A heat-ray shielding film was formed on a glass base by employing a solid concentration of 1.2% by weight in the solution C and otherwise repeating Example 21, and was tested in the same way as in Example 17. The results are shown in Table 3.

Example 26 (Comparative Example)

A shielding film was formed on a glass base by employing fine particles of ruthenium oxide ($RuO_2$) having an average particle diameter of 120 nm and otherwise repeating Example 15, but the glass base as obtained had a very high haze value of 35 and looked like frosted glass. A large amount of sediment was formed in the ink, and no heat ray shielding film as intended could be obtained.

Example 27 (Comparative Example)

A shielding film was formed on a glass base by employing a solid concentration of 1% by weight in the solution C and a ruthenium oxide and epoxy resin ratio by weight ($RuO_2$:resin) of 80:20 and otherwise repeating Example 17, but the glass base as obtained had a considerably high haze value of 18 and looked like frosted glass. A large amount of sediment was formed in the ink, and no heat ray shielding film as intended could be obtained.

TABLE 3

| Example No. | Solid concentration in solution C (wt %) | Ratio of solid concentrations in solution C (wt %) | Haze (%) | Transmittance of visible light (%) | Solar Transmittance (%) | Transmittance of ultraviolet radiation (%) | Surface resistivity ($\Omega/\square$) |
|---|---|---|---|---|---|---|---|
| Ex. 17 | 4 | 75:25 | 1.1 | 40.2 | 29.7 | 10.1 | $7.8 \times 10^7$ |
| Ex. 18 | 1.2 | 80:20 | 0.9 | 72.4 | 61.5 | 36.0 | $6.9 \times 10^7$ |
| Ex. 19 | 1.4 | 70:30 | 0.8 | 75.6 | 65.9 | 37.1 | $1.5 \times 10^8$ |
| Ex. 20 | 1.8 | 100:0 | 1.2 | 78.1 | 66.32 | 38.6 | $2.3 \times 10^5$ |
| Ex. 21 | 1.3 | 85:15 | 1.3 | 71.2 | 61.3 | 35.5 | $8.5 \times 10^7$ |
| Ex. 22 | 4 | 85:15 | 0.9 | 38.1 | 28.6 | 8.3 | $1.2 \times 10^7$ |
| Ex. 23 | 1.3 | 75:25 | 1.0 | 73.1 | 62.9 | 37.5 | $9.5 \times 10^8$ |
| Ex. 24 | 1.3 | 80:20 | 0.9 | 72.8 | 64.1 | 39.1 | $8.6 \times 10^8$ |
| Ex. 25 | 1.2 | 75:25 | 1.2 | 74.1 | 66.2 | 40.5 | $1.8 \times 10^8$ |
| Ex. 26 | 4 | 75:25 | 35 | — | — | — | — |
| Ex. 27 | 1 | 80:20 | 18 | — | — | — | — |

As is obvious from the foregoing, the heat-ray shielding film of this invention is very effective in cutting off heat rays, since it has a high efficiency for cutting off wavelengths in the near-infrared region (780 to 1400 nm) having a high intensity in the spectrum of the rays of the sun. As it can absorb light having wavelengths in the ultraviolet region which exerts an adverse effect on the human body, and as it has a high transmittance of rays in the visible region and its transmittance can be controlled, it can be used as a material for an optical filter which can control light having wavelengths in the ultraviolet, visible and near-infrared regions together, and has a wide range of uses. Moreover, the film according to this invention has a surface resistivity of 1 M$\Omega/\square$ or above despite the use as its principal component of a highly conductive substance such as ruthenium-, iridium- or rhodium-containing oxide, and has, therefore, the advantage that if a base on which the film is formed is used as a building material, it enables the indoor use of a radio communications apparatus such as a portable telephone, or a radio wave receiver such as a radio, television, or pocket bell.

This invention is of great practical utility because of, for example, its suitability in forming a film in a large area, as the heat-ray shielding film of this invention can be formed by employing a simple and inexpensive coating method without relying upon any conventional dry coating method that requires expensive vacuum equipment.

What is claimed is.:

1. A process for forming a multilayer heat-ray shielding film which comprises applying onto a transparent base a coating solution for a heat-ray shielding film comprising a dispersion obtained by dispersing in a dispersion medium as its main component fine particles of at least one oxide selected from the group consisting of ruthenium-, iridium- and rhodium-containing oxides, said particles having an average particle diameter of up to 100 nm, heating said coating solution to form a first film-forming layer having a thickness of 0.05 to 5 microns, applying onto said first film-forming a layer solution containing at least one selected from the group consisting of a resin binder, a metal alkoxide of silicon, zirconium, titanium or aluminum, and a partially hydrolyzed polymer of said metal alkoxide, and heating it to form a second film-forming layer.

2. A process for forming a multilayer heat-ray shielding film as set forth in claim 1, wherein said heating for forming said first film-forming layer is performed at a temperature of at least 100° C., and said heating for forming said second film-forming layer is performed at a temperature of at least 200° C.

3. A process for forming a multilayer heat-ray shielding film which has a surface resistivity of at least $2 \times 10^4$ $\Omega/\square$ and which transmits both solar and visible light, the solar transmittance being at least 7.9 points lower than the visible light transmittance, which process comprises applying into a transparent base a coating solution for a heat-ray shielding film comprising a dispersion obtained by dispersing in a dispersion medium as its main component fine particles of ruthenium-, iridium- and rhodium-containing oxides, said particles having an average particle diameter of 100 nm, whereby a first coating layer is formed, applying onto said first coating layer a solution containing at least one component selected from the group consisting of a resin binder, a metal alkoxide of silicon, zirconium, titanium or aluminum, and a partially hydrolyzed polymer of said metal alkoxide to form a second coating layer, and heating the said transparent base and said first and second coating layers thereon.

4. A process for forming a multilayer heat-ray shielding film as set forth in claim 3, wherein said heating is performed at a temperature of at least 200° C.

* * * * *